(12) United States Patent
Chirol et al.

(10) Patent No.: US 9,011,062 B2
(45) Date of Patent: Apr. 21, 2015

(54) GUIDING DEVICE WHICH IS INTENDED TO BE INTERPOSED BETWEEN A DEVICE FOR FIXING COMPONENTS OF AN ASSEMBLY, AND A DEVICE FOR PROTECTING THE FIXING DEVICE

(71) Applicants: Airbus Operations (SAS), Toulouse (FR); Airbus Operations Ltd, Filton, Bristol (GB)

(72) Inventors: Clement Chirol, Trebons sur la Gasse (FR); Philip Cresswell, Leguevin (FR); Florian Dapot, Toulouse (FR)

(73) Assignees: Airbus Operations SAS, Toulouse (FR); Airbus Operations Ltd., Bristol (GB)

( * ) Notice: Subject to any disclaimer, the term of this patent is extended or adjusted under 35 U.S.C. 154(b) by 0 days.

(21) Appl. No.: 14/265,994

(22) Filed: Apr. 30, 2014

(65) Prior Publication Data

US 2014/0321944 A1    Oct. 30, 2014

(30) Foreign Application Priority Data

Apr. 30, 2013  (FR) ...................................... 13 53976

(51) Int. Cl.
| | |
|---|---|
| F16B 37/14 | (2006.01) |
| F16B 33/00 | (2006.01) |
| B64D 45/02 | (2006.01) |
| F16B 5/02 | (2006.01) |
| F16B 19/05 | (2006.01) |
| F16B 39/02 | (2006.01) |

(52) U.S. Cl.
CPC .............. *F16B 33/004* (2013.01); *B64D 45/02* (2013.01); *F16B 5/025* (2013.01); *F16B 19/05* (2013.01); *F16B 37/14* (2013.01); *F16B 39/025* (2013.01)

(58) Field of Classification Search
USPC ................... 411/372.5, 372.6, 375, 500, 501; 29/515
See application file for complete search history.

(56) References Cited

U.S. PATENT DOCUMENTS

| | | | | |
|---|---|---|---|---|
| 2,056,036 | A | * | 9/1936 | Catron et al. ................. 439/820 |
| 2,737,222 | A | * | 3/1956 | Becker ........................ 411/105 |
| 2,976,901 | A | * | 3/1961 | Heyworth .................... 411/105 |
| 3,192,980 | A | * | 7/1965 | Sauter ......................... 411/105 |

(Continued)

FOREIGN PATENT DOCUMENTS

| | | |
|---|---|---|
| EP | 0248122 | 12/1987 |
| EP | 2465777 | 6/2012 |

(Continued)

OTHER PUBLICATIONS

French Search Report, Jan. 14, 2014.

*Primary Examiner* — Roberta DeLisle
(74) *Attorney, Agent, or Firm* — Greer, Burns & Crain Ltd.

(57) ABSTRACT

An assembly comprising at least two non-metal components which are fixed to each other using at least one fixing system. The fixing system includes a fixing device with a fixing element which is provided with a head and a rod, and a crimping ring which is in contact with one of the components. A protection device is a part of the fixing system which delimits a cavity for confining gas around a portion of the device comprising the crimping ring. In order to improve the repeatability of the operation for positioning the protection device, a guiding device is provided which includes an assembly element on the portion of the fixing device, and an element for guiding the protection device.

16 Claims, 4 Drawing Sheets

(56) References Cited

U.S. PATENT DOCUMENTS

| | | | | |
|---|---|---|---|---|
| 5,658,107 | A | * | 8/1997 | Smith .............................. 411/34 |
| 6,053,683 | A | * | 4/2000 | Cabiran ...................... 411/372.6 |
| 6,464,438 | B1 | * | 10/2002 | Dowling ...................... 411/107 |
| 7,878,747 | B2 | * | 2/2011 | Dean et al. .................. 411/372.5 |
| 8,763,627 | B2 | * | 7/2014 | Richards ...................... 137/343 |

| | | |
|---|---|---|
| 2012/0219380 | A1 | 8/2012 Hutter |

FOREIGN PATENT DOCUMENTS

| | | |
|---|---|---|
| EP | 2500272 | 9/2012 |
| EP | 2551187 | 1/2013 |
| WO | 9734734 | 9/1997 |

* cited by examiner

GUIDING DEVICE WHICH IS INTENDED TO BE INTERPOSED BETWEEN A DEVICE FOR FIXING COMPONENTS OF AN ASSEMBLY, AND A DEVICE FOR PROTECTING THE FIXING DEVICE

CROSS-REFERENCES TO RELATED APPLICATIONS

This application claims the benefit of the French patent application No. 201353976 filed on Apr. 30, 2013, the entire disclosures of which are incorporated herein by way of reference.

BACKGROUND OF THE INVENTION

The present invention relates to the field of component assemblies, comprising at least one fixing device which is provided with a crimping ring. The invention more specifically relates to positioning a device for protecting the fixing device against the risks linked with lightning strikes.

The invention is very preferably used for assemblies for aircraft.

The fixing of non-metal components can be carried out with devices of the type comprising, on the one hand, a fixing element which is provided with a rod having a head and, on the other hand, a crimping ring. Using such crimped fixing devices, the components are clamped between the head and the crimping ring in order to carry out the plating thereof.

In particular for aeronautical applications, it is advantageous to protect the assembly against the risks linked with lightning strikes. This is because, when an arc of lightning strikes the head of the fixing element, an internal sparking can be seen between the rod of the fixing element and the non-metal components which are clamped between the head and the crimping ring. This sparking corresponds to the transfer of the current between the fixing device and these same components. The sparking leads to heating of the air in the zone of the bore of the components, possibly resulting in a release of hot gases at the side of the crimping ring. This phenomenon is known as "outgassing."

In order to reduce the risks linked with such a release of hot gases, there is provision in the prior art for a protection device to be fitted which covers the portion of the fixing device located at the side of the crimping ring. Such a protection device delimits a confinement cavity into which any hot gases which are discharged can be introduced when lightning strikes the head of the fixing element. Consequently, the hot gases may remain confined in the cavity, thus protecting the surrounding elements which may be sensitive to these hot gases, for example, elements which are sensitive to heat.

The protection device is generally in the form of one or more caps which cover the portion of the fixing device located at the side of the crimping ring. These are generally two caps which are fitted one in the other with a sealing material placed in the space which separates those two caps. In a state applied and pressed against the non-metal component which receives the crimping ring, the protection device releases a portion of the sealing material which forms a sealed joint between the caps and the relevant component around the fixing device. The confinement, cavity can then be completely tight for better retention of the hot gases.

With caps which cover the portion of the fixing device including the crimping ring, the protection device also allows the risks of any spark to be limited between the crimping ring and the surface of the non-metal component against which this ring is in abutment and in contact. This phenomenon, which is also capable of being brought about in the region of the ring when the head of the fixing element is struck by lightning, is known as "thermal sparking."

Satisfactory fitting of the protection device on the assembly requires above all correct positioning thereof relative to the fixing device which it covers. In particular it is important that the entire periphery thereof is pressed against the component to be fixed, around the fixing device.

In this regard, in order to ensure guiding of the protection device when it is placed around the fixing device, it has been envisaged to use the external lateral surface of the crimping ring as a guiding component. Nevertheless, after the crimping operation, the ring has a deformed geometry resulting from the creep of material brought about by this same crimping operation. Generally, the deformation seen is generated in the region of the end of the ring in contact with the component to be clamped, this end being able to be in the form of a crimping flange.

The deformed ring, although it provides satisfactory clamping, can be found to be ineffective in ensuring the guiding required for the protection device. It should further be noted that this risk is increased when an inclination exists between the axis of this crimping ring and the normal relative to the surface of the non-metal component against which this ring is in abutment. This is because, under these circumstances, the creep of material within the ring is more significant during, the crimping operation.

Taking, the above into account, the current solution involves the problem of the ability to repeat the operation for positioning the protection device.

SUMMARY OF THE INVENTION

An object of the invention is therefore to overcome at least partially the disadvantages mentioned above, relating to the embodiments of the prior art.

To this end, the invention first relates to an assembly comprising at least two non-metal components which are fixed to each other using at least one fixing system comprising:

a fixing device comprising, on the one hand, a fixing element which is provided, with a head and a rod and, on the other hand, a crimping ring which is mounted on the rod and which is arranged in contact with one of the non-metal components;

a protection device which delimits a cavity for confining gas around a portion of the fixing device comprising the crimping ring.

According to the invention, the system further comprises a guiding device for guiding the protection device, the guiding device comprising an assembly element on the portion of the fixing device, and an element for guiding the protection device, the guiding element surrounding the portion of the fixing device.

The invention is advantageous in that it breaks with existing technology which is intended to guide the protection device with the crimping ring of the fixing device. It makes provision for the addition of an intermediate guiding device mounted on the portion of the fixing device comprising the ring in contact with one of the components to be fixed. Consequently, the guiding of the protection device is ensured by the attached guiding element and not by the crimping ring itself. The guiding is consequently improved since it is no longer dependent on the geometry of the ring, which is subject to the creep of material when it is crimped. The result is improved ability to repeat the operation for positioning the protection device around the fixing device.

The assembly according to the invention preferably comprises at least one of the following additional features, taken in isolation or together.

The guiding device further comprises an element for connecting the assembly element to the guiding element, the assembly element having an assembly hole through which the portion of the fixing device extends, and the guiding element comprises a hole for passage of the portion of the fixing device.

The connection element, can be deformed so as to allow movement from a non-loaded configuration, in which the guiding element is held relative to the assembly element with the passage hole and the assembly hole substantially in a coaxial state, to a deformed configuration in which the guiding element is held relative to the assembly element with an axis of the passage hole inclined relative to an axis of the assembly hole.

The deformable connection element is resilient, for example, a compression spring or a bellows, or any other resilient element such as an element of elastomer material. Alternatively, the connection element may be plastically deformable, for example, a tube or a rigid bellows.

The assembly element is a ring, preferably having a frustoconical assembly hole.

The assembly element is retained on the portion of the fixing device by means of friction. Alternatively, it could be retained by means of screwing, for example, at the free end of the rod protruding from the crimping ring.

The assembly element is preferably mounted on the crimping ring.

The guiding element is a ring, which preferably has a cylindrical external lateral surface, preferably having a circular cross section.

The guiding element surrounds a crimping flange of the crimping ring.

The protection device comprises two caps which are fitted one inside the other.

Preferably, an axis of the crimping ring in contact with a surface of one of the non-metal components is inclined relative to the normal with respect to this surface. However, the invention is not only used when the components to be fixed are referred to as being "inclined", but is also used when the normal relative to the surface of the component is parallel with or in alignment with the axis of the crimping, ring.

The invention also relates to an aircraft which comprises at least one such assembly.

The invention also relates to a guiding device for an assembly as described above, the guiding device comprising:

an assembly element which is intended to be mounted on the portion of the fixing device and which has an assembly hole through which the portion of the fixing device is intended to extend;

a guiding element which is intended to guide the protection device, the guiding element comprising a passage hole through which the portion of the fixing device is intended to extend; and a connection element for connecting the assembly element to the guiding element, the connection element being deformable so as to allow movement from a non-loaded configuration, in which the guiding element is held relative to the assembly element with the passage hole and the assembly hole substantially in a coaxial state, to a deformed configuration, in which the guiding element is held relative to the assembly element with an axis of the passage hole inclined relative to an axis of the assembly hole.

Preferably, the assembly element is a ring and the guiding element is also a ring, which rings are preferably connected to the ends of the connection element, respectively.

Of course, all the other optional features described above can also be applied to this fixing device.

Finally, the invention also relates to a method for producing an assembly as described above, comprising the following successive steps:

assembling the fixing device by crimping the ring against one of the non-metal components;

positioning the guiding device on the portion of the fixing device comprising the crimping ring; and positioning the protection device on the non-metal components in order to cover the portion of the fixing device comprising the crimping ring, the positioning being carried out by guiding the protection device with the guiding element of the guiding device.

Other advantages and features of the invention will be appreciated from the non-limiting detailed description set out below.

BRIEF DESCRIPTION OF THE DRAWINGS

This description will be set out with respect to the appended drawings, in which.

DETAILED DESCRIPTION OF THE PREFERRED EMBODIMENTS

Figure 1:
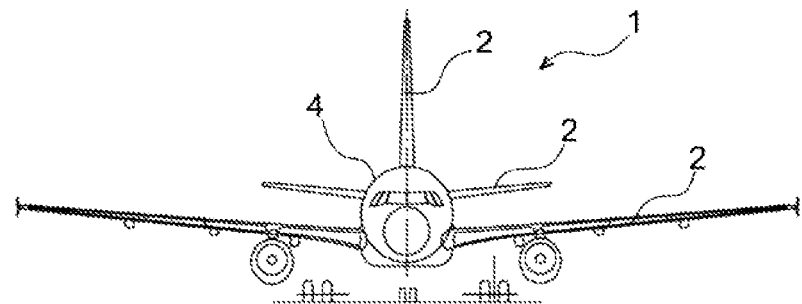
FIG. 1 is a schematic front view of an aircraft which is intended to comprise one or more assemblies according to the invention.

FIG. 1 illustrates an aircraft 1 which is intended to incorporate one or more assemblies according to the invention, for example, in the region of the wings 2 and/or in the region of the fuselage 4 thereof.

The invention involves the assembly of at least two non-metal components with each other, for example, panels or the like. The stacked components are preferably of composite material, produced from a mixture of fibers and a resin. There are preferably used carbon fibers having an intermediate modulus "IM" and an epoxy resin, optionally charged with nodules of thermoplastic resin. This composition substantially weakens the electrical conductivity of the components. There is consequently a need to protect the assembly against specific phenomena linked to the lightning strike, these phenomena in particular being those described above.

Figure 2:
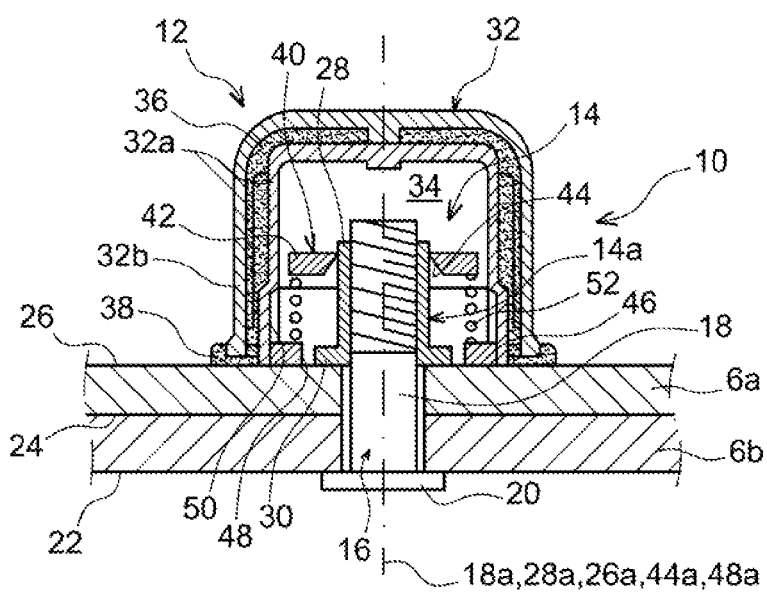
FIG. 2 is a sectioned view of an assembly according to a first preferred embodiment of the invention.

In the first embodiment shown in FIG. 2, the assembly 10 comprises two stacked components 6a, 6b of composite material. They are fixed to each other by means of several fixing, systems 12, only one of which has been illustrated. It will be described in detail below.

The system 12 first comprises a fixing device 14 which comprises a fixing element in the form of a pin 16 which is also called a riveting pin. This pin comprises a rod 18, the free end of which is threaded. At the opposite end, the rod 18 carries a head 20 in abutment with the free surface 22 of the component 6b. The free surface is the one opposite the interface 24 between the two components 6a, 6b. In a similar manner, the component 6a has a free surface 26 opposite the interface 24, the two free surfaces 22, 26 corresponding to the surfaces of opposing ends of the stack of components. At least locally in the region of the fixing system 12, these surfaces 22, 26 are each planar.

The fixing device 14 is supplemented by a crimping ring 28 which is preferably screwed to the rod 18 of the pin 16. In the crimped state as illustrated, in FIG. 2, the ring 28 has at the end thereof a crimping flange 30 which is in direct abutment against the free surface 26 of the component 6a. There is therefore contact between the flange 30 and the planar surface 26, it may be noted that, in the embodiment of FIG. 2, no washer or the like is interposed between the flange 30 and the planar surface 26. There is consequently an increase in mass and a simplification of the assembly, the assembly being able to be more readily automated.

In a state joined together, the pin 16 and the ring 28 form a fixing, device for crimping of the type known as a "lockbolt" it allows the components 6a, 6b to be clamped between the head 20 and the crimping flange 30. The pin 16 and the ring 28 are preferably metal, for example of stainless steel.

The system 14 is also provided with a device 32 for protecting the device 14 against the risks linked with lightning strikes. The device 32 is pressed against the free surface 26 of the component 6a. It surrounds and covers all the portion 14a of the fixing device 14 which protrudes from this surface 26, including in particular the ring 28. The device 32 delimits a cavity 34 for confining gas around the portion 14a, which incorporates, in addition to the ring 28, the portion of the rod 18 which protrudes from the free surface 26.

The protection device 32 has an axial cross section which is generally U-shaped, the base of the U being located opposite and remote from the free end of the rod 18, whilst, the branches of the U are located remote from and opposite the external lateral surface of the ring 28. The device 32 further has a substantially circular cross section, thus delimiting a substantially cylindrical cavity 34 having a circular cross section.

Preferably, the protection device 32 is produced using two caps 32a, 32b which are fitted one inside the other and which are coaxial. They are non-metallic, for example, produced from polymer material. Between the two of them, there is provided an annular space which is filled with a sealing mastic 36. The mastic 36 or similar sealing material protrudes from the space between the caps to form a sealed joint 38 between the periphery of the caps 32a, 32b and the surface 26 of the component 6a.

The joint 38 which is arranged around the portion 14a of the device 14 and, more specifically in a plane substantially identical to that of the crimping flange 30, ensures the sealing of the confinement cavity 34. This cavity is therefore delimited jointly by the internal cap 32a, the free surface 26 of the component 6a and the sealing joint 38.

When a lightning arc strikes the head 20, an internal sparking can be seen between the rod 18 and the non-metal components 6a, 6b. This sparking leads to heating of the air in the zone of the bore of the components, potentially resulting in a discharge of hot gases between the rod 18 and the ring 28 or between the flange 30 and the surface 26. In these two cases, the gases are introduced and remain confined in the cavity 34, which ensures the safety of the surrounding elements.

Furthermore, the caps 32a, 32b also enable the risks of any sparking between the ring 28 and the adjacent portion of the surface 26 to be limited, which portion is not covered by the caps 32a, 32b.

It should be noted that the caps 32a, 32b are configured so as to be able to be moved in translation relative to each other, along, the common axis thereof. In known manner, which is reflected in the present invention, their configuration is such that pressing one inside the other leads to the reduction of the space between the caps. This reduction in volume can be seen in a discharge of the mastic initially provided in this space, the discharged material forming the sealing joint 38. To this end, in the non-assembled state, there is provision for the internal cap 32a to have one end which protrudes relative to the external cap 32b. Therefore, after the contact of the protruding end of the internal cap 32a on the surface 26, continued pressure on the external cap 32b leads to the relative movement mentioned above, bringing about the desired overflow or the mastic.

The fixing system 12 also comprises a device 40 for guiding the protection device 32. The guiding device first comprises an assembly element in the form of a ring 42. The ring 42 defines an assembly hole 44 which is preferably frustoconical. The portion 14a of the fixing device 14 extends through this assembly hole 44. More specifically, this hole 44 has a wall which is retained by means of friction around the external lateral surface of the ring 28. The frustoconical shape of the assembly hole 44 allows the ring 42 to be adapted to any geometric imperfections of the external lateral surface of the ring 28, these imperfections being capable of being generated during the crimping operation.

The device 40 also comprises an element 46 for guiding the protection device 32, this element 36 preferably also being in the form of a ring. This ring, is pressed against the free surface 26 of the component 6a, surrounding the portion 14a of the fixing device 14. More specifically, the ring 46 has a passage hole 48 through which the ring 28 extends with spacing. This is because the inner wall of the ring 46 is located radially opposite and remote from the crimping flange 30, preferably located substantially in the same plane parallel with the surface 26.

The ring 46 therefore surrounds the flange 30 and has an external lateral surface which is preferably cylindrical and which more preferably has a circular cross section. The diameter of this external lateral surface of the ring 46 is preferably greater than the outer diameter of the ring 42. This allows the external lateral surface of the ring 46 itself to perform the function of guiding the inner cap 32a. This is because, close to the opening thereof, the cap 32a has an inner guiding surface 50 having a shape which complements that of the external lateral surface of the ring 46. Therefore, when the device 32 is positioned on the component 6a and covers the portion 14a of the device 14, before its contact with the surface 26, it is guided by the ring 46 which allows it to be centered relative to the fixing device 14. This centering/guiding ensures that the periphery of the protection device 32 is correctly in contact with the surface 26 of the component 6a, over the entire length of that periphery. This enables the operation for positioning the protection device 32 to be readily repeated since the operator carrying out such a task senses firm and stable support on the surface 26, bringing about a sensitive return which translates into good positioning. Similar advantages are obtained if the device 32 were to be positioned in an automated or semi-automated manner.

Furthermore, the correct positioning of the protection device 32 relative to the fixing device 14 not only allows the positioning thereof on the component 6a to be made easier, but also ensures that the sealing joint 38 will be correctly placed on the surface 26 of the component 6a. The risks of lack of sealing of the cavity 34 are thus greatly limited, or reduced to zero.

In order to ensure that the guiding ring 46 is pressed against the surface 26 of the component 6a, the guiding device 40 finally comprises a connection element 52, one end of which is fixedly joined to the assembly ring 42, and the opposite end of which is fixedly joined to the centering ring 46.

In this instance, the connection element is a compression spring 52. Therefore, in an assembled configuration as illustrated in FIG. 2, the friction three which retains the assembly ring 42 on the crimping ring 28 is sufficiently great to withstand the pressing force developed by the spring 52 and directly transmitted to this same assembly ring 42.

In this first preferred embodiment, the surface 26 of the component 6a has a normal which is substantially in alignment with the axis of the fixing device 14. That is to say, the axis 18a of the pin 18, the axis 28a of the crimping ring 28, the normal 26a relative to the surface 26, the axis 44a of the assembly hole 44 and the axis 48a of the passage hole 48 are all in alignment. Consequently, when the intermediate guiding device 40 is placed on the portion 14a of the fixing device, the pressing of the guiding, ring 46 on the surface 26 leads to this ring 46 moving closer to the ring 42. This approach is enabled by a compression of the spring 52 which is uniform in the circumferential direction thereof. During this approach, the rings 42, 46 remain substantially parallel and coaxial, as when the spring 52 is not in a biased state, that is to say, in the non-tensioned state of the device 40.

It should be noted that the guiding device 40 is mounted on the fixing device 14 without being subjected to the clamping, forces of the components developed by the same device 14.

Figure 3A:
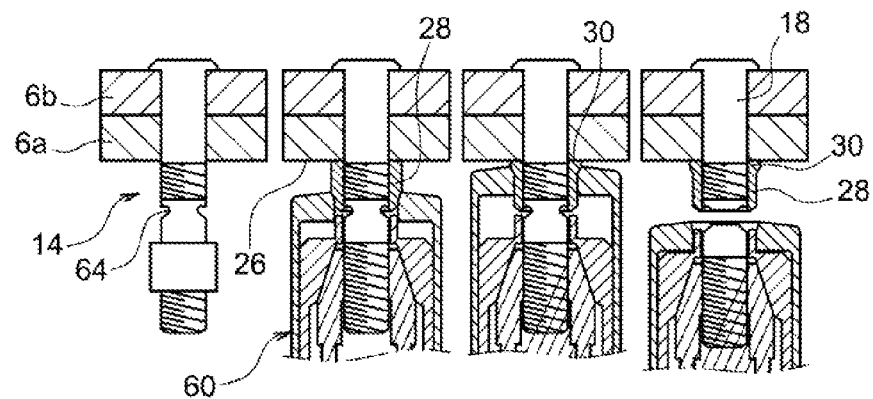
FIGS. 3a and 3b are views showing different steps of a production method according, to the invention which is intended to obtain the assembly shown in FIG. 2.
Figure 3B:
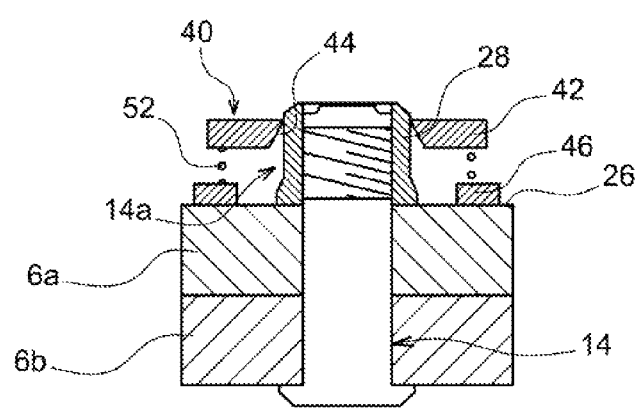

The rings 42, 46 are preferably produced from plastics material and fixed to the ends of the spring 52. For example, they are produced by means of injection directly on the spring 52 so that they are fixedly joined to the ends thereof, FIGS. 3a and 3b show different steps of a method for producing the assembly 10 shown in FIG. 2. First of all, for each fixing system 12, the fixing device 14 of the "lockbolt" type is arranged through the components 6a, 6b to be joined together. This step can be seen in the left-hand drawing of FIG. 3a. Then, in order to continue the assembly of the fixing, device 14, the crimping of the ring 28 is carried out using a conventional crimping tool 60. This phase is illustrated in the three right-hand drawings of FIG. 3. The crimping brings about the abutment and the clamping of the flange 30 against the surface 26 of the component 6a. Furthermore, during the crimping, the volume of this flange 30 increases as a result of the creep of material brought about by the tool 60. It is this creep of material which modifies the initial circularity of the external lateral surface of the ring 28 and the flange 30 thereof. At the end of the crimping, as can be seen in the drawing at the right-hand side of FIG. 3a, a distal end of the rod 18 is cut in the region of a groove 64 which is arranged on the rod and retracted so that the rod protrudes from the ring 28 only by a short length. There is a resultant increase in mass for the assembly. Furthermore, it should be noted that the groove 64 acts as an engagement for the tool 60.

With reference now to FIG. 3b, the guiding device 40 is then positioned on the ring 28. To this end, the assembly ring 42 is force-mounted around the ring 28. By continuing the pressure on the ring 42 sliding along the crimping ring 28, the guiding ring 46 becomes pressed onto the free surface 26 of the component 6a, via the compression spring 52 which is compressed in a substantially uniform manner in the circumferential direction thereof. Alternatively, the contact of the guiding ring 46 on the surface 26 could be produced before the ring 28 is introduced into the hole 44 of the assembly ring 42.

Finally, returning to FIG. 2, the protection device 32 is positioned so as to cover the portion 14a of the device 14. During this positioning, the guiding surface 50 of the inner cap 32a cooperates with the ring 46 in order to obtain satisfactory centering of the protection device 32 around the portion 14a. During this positioning, the abutment against the external cap 32b may be maintained until the overflowing mastic has hardened, forming the sealing joint 38.

These steps are repeated for each of the fixing systems 12 clamping the components 6a, 6b.

Figure 4:
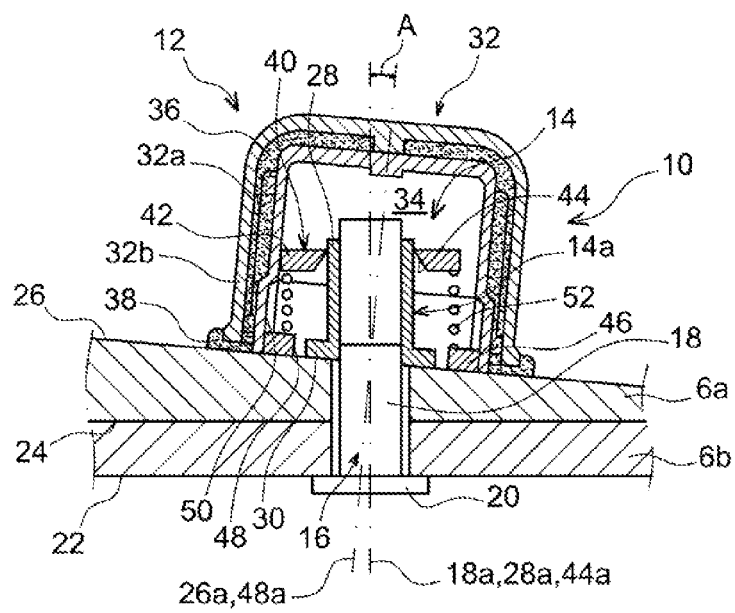
FIG. 4 is a sectioned view of an assembly according to a second preferred embodiment of the invention.

As set out above, when the device 40 is placed on the crimping ring 28, the rings 42, 46 move closer together, during which time they remain substantially parallel and coaxial, as in the nominal non-tensioned state of the device 40. However, the configuration considered advantageously allows adaptation to the components which have an inclination. Such an example is illustrated in FIG. 4 which corresponds to an assembly 10 according to a second preferred embodiment of the invention. In this second embodiment, the elements which the fixing system 12 comprises are the same as those of the first embodiment described above. In this regard, in the figures, the elements which have the same reference numerals correspond to elements which are identical or similar.

Only the geometry of the components 6a, 6b differs with respect to that of the first embodiment. In particular, the surface 26 of the component 6a is inclined with respect to the opposite surface 22 of the stack. In this instance, the axis 28a of the ring 28, which is still in alignment with the axes 18a and 44a is inclined by an angle A relative to the normal 26a to the surface 26, this normal 26a still being in alignment with the axis 48a of the hole of the guiding ring 46.

That is to say, the configuration of the compression spring 52 is such that it allows the movement from the non-loaded configuration, in which the guiding ring 46 is held relative to the assembly ring 42 with the passage hole 48 and the assembly hole 44 substantially in a coaxial state, to a deformed configuration in which the guiding ring 46 is held relative to the assembly ring 42 with the axis 48 inclined relative to the axis 44a. The angle A formed between the two axes 44a, 48 may, for example, be up to 7°. The movement from one configuration to the other, which can be reversed as a result of the resilient nature of the spring, is thus allowed by a non-uniform deformation of this spring 52 in the circumferential direction thereof.

Figure 5A:
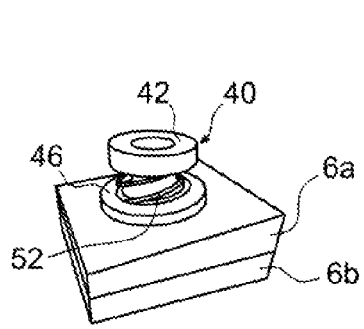
FIGS. 5a and 5b are views illustrating different steps of a production method according to the invention which is intended to obtain the assembly shown in FIG. 4.
Figure 5B:
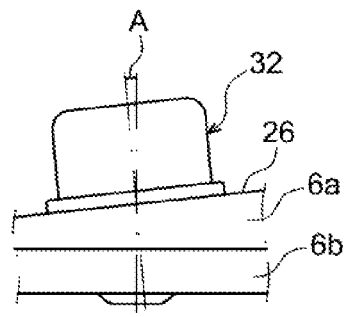

With reference to FIGS. 5a and 5b, different steps of a method for producing the assembly 10 shown in FIG. 4 are illustrated. The steps are the same as those described for the first embodiment and will therefore not be described, in a detailed manner. It should simply be noted that it is during the positioning of the guiding device 40, illustrated in FIG. 5a, that the compression spring 52 moves from its non-loaded configuration to the deformed configuration thereof allowing the axis 48a to be moved orthogonally relative to the surface 26 of the component 6a. As a result of the inclination of the ring 46 obtained by means of non-uniform deformation of the spring 52 on the periphery thereof, the subsequent guiding of the protection device 32 may be carried out in the correct direction, that is to say, orthogonally with respect to the surface 26. This allows the periphery of the device 32 to be brought into planar contact with the inclined surface 26 of the component 6a.

FIG. 5b illustrates the final step for assembling this protection device 32 on the surface 26.

It should be rioted that the use of the compression spring 52 is only a preferred solution for performing the function of the connection element between the two rings 42, 46. It has the advantage of adapting to surfaces of different inclinations and, of course, to non-inclined surfaces. A single reference is thus required for all situations, which facilitates the production of the assemblies 10.

Figure 6A:
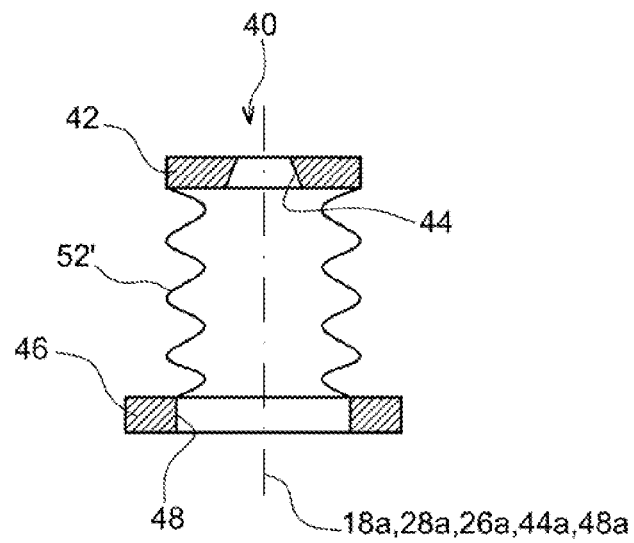
FIGS. 6a and 6b show an alternative embodiment for the connection element of the fixing system illustrated in the preceding figures, in two different configurations.
Figure 6B:
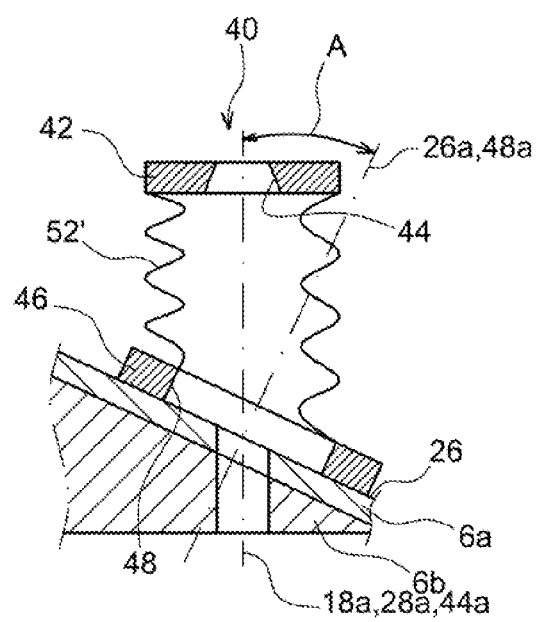

However, other solutions can also be envisaged, with plastic or resilient deformation, such as a bellows 52'. Such a possibility is illustrated in FIGS. 6a and 6b, the first figure illustrating the bellows 52' in a non-loaded configuration whilst the second figure shows this same bellows in a deformed configuration. In the case of a solution having plastic deformation, this deformation can be seen during the positioning of the device 40 on the fixing device, by the abutment of the ring 46 on the inclined surface 26. This plastic deformation is retained for the entire service life of the assembly.

Finally, when the guiding device 40 is provided to press only on components 6a, 6b which have non-inclined surfaces, the configuration may be simplified. For example, it is not necessary to have a deformable connection element. Furthermore, the above-mentioned separate elements of the guiding device 40 may optionally, for some or all of them, be produced in one piece. For example, in a configuration which is very greatly simplified, the guiding device 40 could be in the form of a single ring whose hole would constitute the assembly element which is passed through and retained by the external lateral surface of IC crimping ring 28 and whose external lateral surface of the single ring would constitute the guiding element which allows the protection device 32 to be guided. This single ring could further be mounted at any location around the portion 14a of the fixing device 14 without being subjected to the clamping forces of the components developed by this same device 14.

Of course, various modifications may be carried out by the person skilled in the art to the invention which has been described above merely by way of non-limiting examples.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An assembly comprising at least two non-metal components which are fixed to each other using at least one fixing system comprising:
    a fixing device comprising:
    a fixing element which is provided with a head and a rod, and
    a crimping ring which is mounted on the rod and which is arranged in contact with one of the non-metal components; and
    a protection device which delimits a cavity for confining gas around a portion of the fixing device comprising the crimping ring,
    wherein the system further comprises a guiding device for guiding the protection device, the guiding device comprising an assembly element, on the portion of the fixing device, and an element for guiding the protection device, the guiding element, surrounding the portion of the fixing device,
    wherein the guiding device further comprises an element for connecting the assembly element to the guiding element,
    wherein the assembly element has an assembly hole through which the portion of the fixing device extends,
    wherein the guiding element comprises a hole for passage of the portion of the fixing device, and
    wherein the connection element is deformable so as to allow movement from a non-loaded configuration, in which the guiding element is held relative to the assembly element with the passage hole and the assembly hole substantially in a coaxial state, to a deformed configuration in which the guiding element is held relative to the assembly element with an axis of the passage hole inclined relative to an axis of the assembly hole.

2. The assembly as claimed in claim 1, wherein the deformable connection element is resilient.

3. The assembly as claimed in claim 2, wherein the deformable connection element is one of a compression spring and a bellows.

4. The assembly as claimed in claim 1, wherein the assembly element is a ring.

5. The assembly as claimed in claim 4, wherein the assembly element has a frustoconical assembly hole.

6. The assembly as claimed in claim 1, wherein the assembly element is retained on the portion of the fixing device by means of friction.

7. The assembly as claimed in claim 1, wherein the assembly element is mounted on the crimping ring.

8. The assembly as claimed in claim 1, wherein guiding element is a ring.

9. The assembly as claimed in claim 8, wherein the guiding element ring has a cylindrical external lateral surface.

10. The assembly as claimed in claim 1, wherein the guiding element surrounds a crimping flange of the crimping ring.

11. The assembly as claimed in claim 1, wherein the protection device comprises two caps which are fined one inside the other.

12. The assembly as claimed in claim 1, wherein an axis of the crimping ring is inclined relative to the normal with respect to this surface.

13. The assembly as claimed in claim 1, and further wherein the assembly is located in an aircraft.

14. A guiding device for an assembly comprising, at least two non-metal components which are fixed to each other using at least one fixing system comprising a fixing device comprising:
    a fixing element which is provided with a head and a rod,
    a crimping ring which is mounted on the rod and which is arranged in contact with one of the non-metal components, and
    a protection device which delimits a cavity for confining gas around a portion of the fixing device comprising the crimping ring,
    the guiding device comprising:
    an assembly element which is intended to be mounted on the portion of the fixing device and which has an assembly hole through which the portion of the fixing device is intended to extend;
    a guiding element which is intended to guide the protection device, the guiding element comprising a passage hole through which the portion of the fixing device is intended to extend; and
    a connection element for connecting the assembly element to the guiding element, the connection element being deformable so as to allow movement from a non-loaded configuration, in which the guiding element is held relative to the assembly element with the passage hole and the assembly hole substantially in a coaxial state, to a deformed configuration in which the guiding element is held relative to the assembly element with an axis of the passage hole inclined relative to an axis of the assembly hole.

15. The guiding device as claimed in claim 14, wherein the assembly element is a ring and wherein the guiding element is also a ring, which rings are preferably connected to the ends of the connection element, respectively.

16. A method for producing an assembly comprising at least two non-metal components which are fixed to each other using at least one fixing system comprising:
   a fixing device comprising:
   a fixing element which is provided with a head and a rod, and
   a crimping ring which is mounted on the rod and which is arranged in contact with one of the non-metal components; and
   a protection device which delimits a cavity for confining as around a portion of the fixing device comprising the crimping ring,
   wherein the system further comprises a guiding device for guiding the protection device, the guiding device comprising an assembly element on the portion of the fixing device, and an element for guiding the protection device, the guiding element surrounding the portion of the fixing device,
   wherein the guiding device further comprises an element for connecting the assembly element to the guiding element,
   wherein the assembly element has an assembly hole through which the portion of the fixing device extends,
   wherein the guiding element comprises a hole for passage of the portion of the fixing device, and
   wherein the connection element is deformable so as to allow movement from a non-loaded configuration, in which the guiding element is held relative to the assembly element with the passage hole and the assembly hole substantially in a coaxial state, to a deformed configuration in which the guiding element is held relative to the assembly element with an axis of the passage hole inclined relative to an axis of the assembly hole, wherein the method comprises the following successive steps:
   assembling the fixing device by crimping the ring against one of the no metal components;
   positioning the guiding device on the portion of the fixing device comprising, the crimping ring; and
   positioning the protection device on the non-metal components in order to cover the portion of the fixing device comprising the crimping ring, the positioning being carried out by guiding the protection device with the guiding element of the guiding device.

* * * * *